United States Patent [19]

Scharres

[11] 4,294,283

[45] Oct. 13, 1981

[54] WEDGE SEALED DAMPER

[76] Inventor: Harry J. Scharres, 10 Gilbert Ave., Clarendon Hills, Ill. 60514

[21] Appl. No.: 95,295

[22] Filed: Nov. 19, 1979

Related U.S. Application Data

[63] Continuation-in-part of Ser. No. 854,591, Nov. 25, 1977, abandoned.

[51] Int. Cl.³ ............................................. F16K 11/14
[52] U.S. Cl. ........................................ 137/601; 49/92; 181/226; 251/305; 251/306
[58] Field of Search ............... 137/601; 49/91, 92; 98/121 A; 251/305, 306; 181/224, 225, 226, 229, 241, 277, 278

[56] References Cited

U.S. PATENT DOCUMENTS

| | | | |
|---|---|---|---|
| 2,890,503 | 6/1959 | Paine | 49/91 X |
| 3,084,715 | 4/1963 | Scharres | 137/601 |
| 3,381,601 | 5/1968 | McCabe | 98/121 A |
| 3,484,990 | 12/1969 | Kahn | 49/91 |
| 3,540,154 | 11/1970 | Claudio | 49/91 |
| 3,547,152 | 12/1970 | Hess | 137/601 |
| 3,771,559 | 11/1973 | Alley | 137/601 |
| 3,813,896 | 6/1974 | Lebahn | 137/493.9 X |
| 3,885,347 | 5/1975 | Adachi | 137/601 X |
| 3,964,377 | 6/1976 | Chapman | 98/121 A X |

FOREIGN PATENT DOCUMENTS

| | | | |
|---|---|---|---|
| 1126116 | 3/1962 | Fed. Rep. of Germany | 49/91 |
| 2622078 | 6/1977 | Fed. Rep. of Germany | 98/121 A |
| 312111 | 10/1971 | U.S.S.R. | 49/92 |

*Primary Examiner*—Robert G. Nilson
*Attorney, Agent, or Firm*—Leydig, Voit, Osann, Mayer and Holt, Ltd.

[57] ABSTRACT

A damper assembly comprising, in combination, a generally rectangular frame including side, top and bottom members, a plurality of damper blades supported at opposite ends on the side members of the frame for limited rotative movement about axes extending longitudinally and substantially centrally of the blades, each of said blades comprising a resilient sealing strip along at least one edge of said blade, and the ends of the blades being angled in opposite directions above and below the rotative axis of the blades, and cooperating with resilient side sealing strips in the frame, the ends of the blades wedging against the sealing strips as the blades approach closed position, the blades being held in closed position by the wedging action.

6 Claims, 17 Drawing Figures

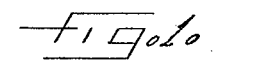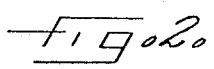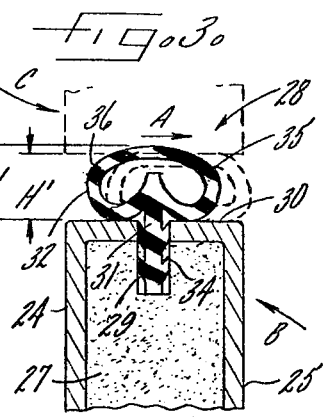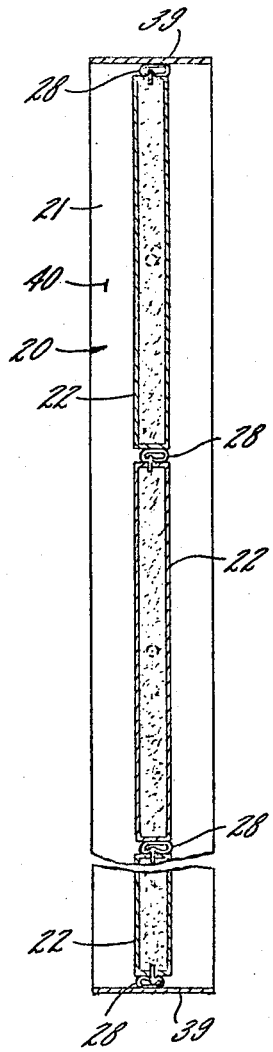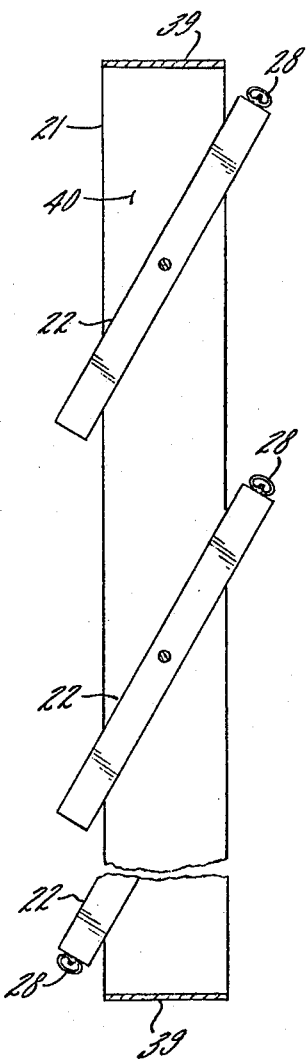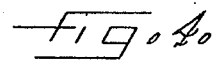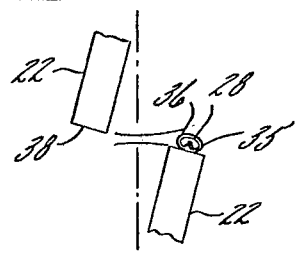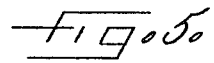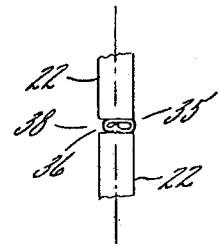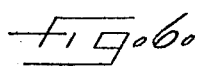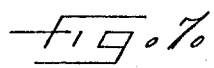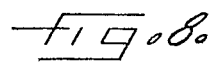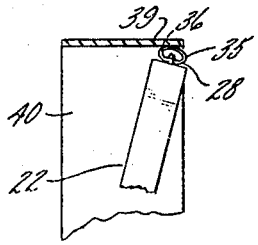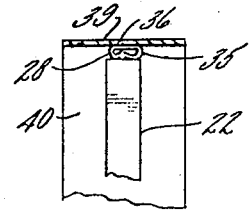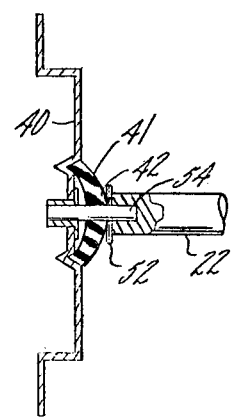

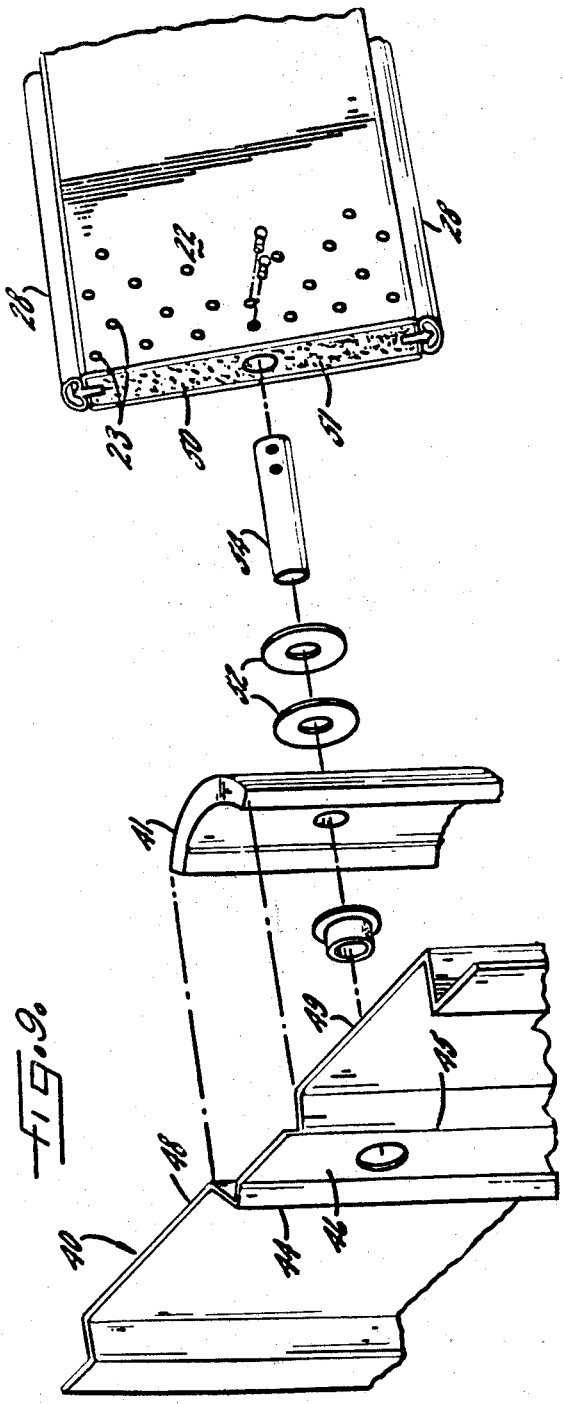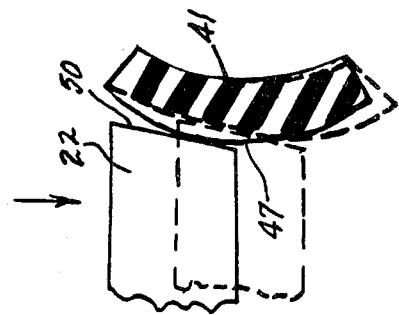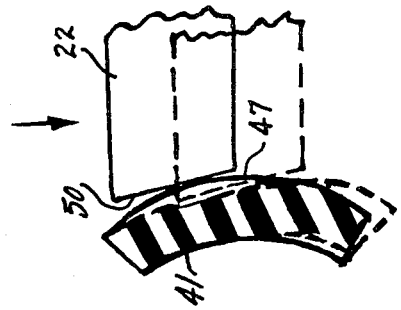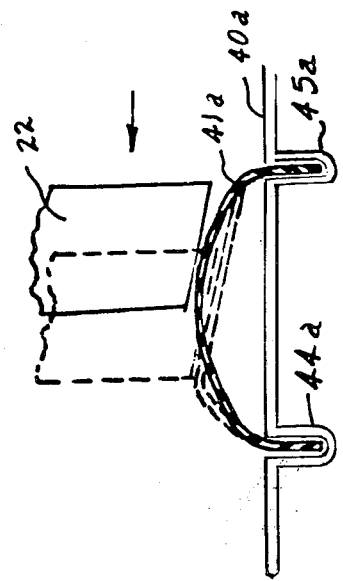

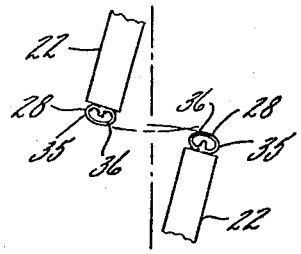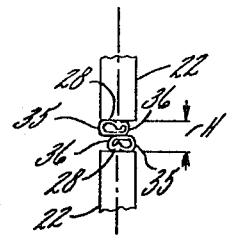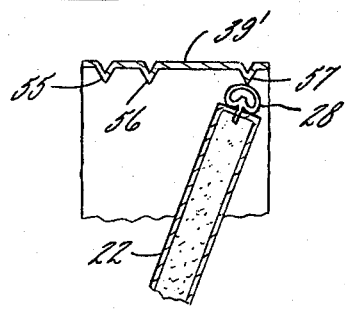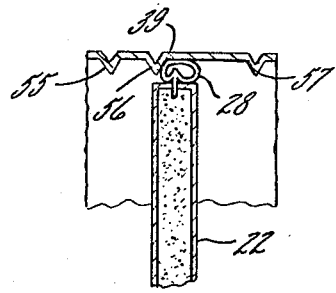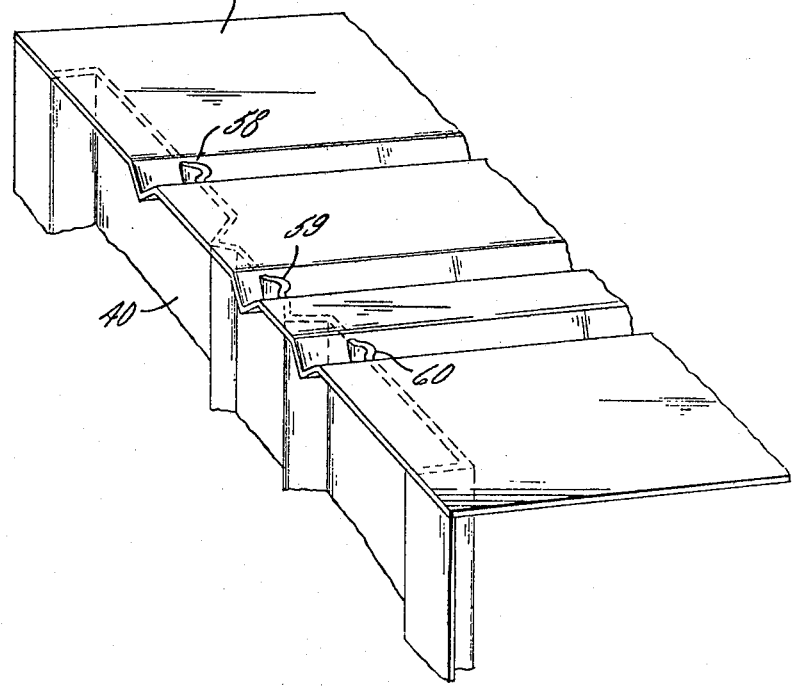

WEDGE SEALED DAMPER

This is a continuation-in-part of application Ser. No. 854,591 filed Nov. 25, 1977, now abandoned.

DESCRIPTION OF THE INVENTION

The invention relates to improvements in dampers for controlling the flow of air or other gases. U.S. Pat. No. 3,084,715 discloses certain improvements in such dampers. The present invention relates to further features to improve the operation, efficiency and economy of the general type of dampers disclosed in the referenced patent.

The general object of the invention is to provide an improved damper assembly which reduces energy loss through the damper when closed.

A more specific object of the invention is to provide an insulating blade construction which reduces heat loss or gain through the damper when closd.

Another object of the present invention is to provide a blade construction which reduces noise penetration through the damper.

Still another object is to provide an improved sealing arrangement for the edges of parallel acting blades and for the edges of blades adjacent stationary frame members, both which reduce the closing force while maintaining an effective seal.

A further object is to provide an improved sealing arrangement for the ends of blades which reduces the closing force and operating friction while effectively sealing between the blade ends and the side frame members.

Yet another object is to provide an improved blade construction which achieves structural rigidity while affording the advantages of being relatively lightweight and thermally insulating to minimize heat loss or gain through the blades when in the closed position.

Other objects and advantages of the invention will become apparent from the following detailed description of the preferred embodiment and modifications illustrated in the accompanying drawings in which:

FIG. 1 is a sectional view through a preferred form of damper assembly having parallel-acting blades and embodying the features of the invention, the damper blades being shown in closed position;

FIG. 2 is a sectional view similar to FIG. 1 showing the damper blades in partially open position;

FIG. 3 is a fragmentary end view of a blade member and sealing means according to the present invention;

FIG. 4 is a fragmentary sectional view on an enlarged scale showing the edges of adjacent parallel-acting blades as they approach the closed position;

FIG. 5 is a fragmentary sectional view similar to FIG. 4 showing the edges of adjacent parallel-acting blades in the fully closed position;

FIG. 6 is a fragmentary sectional view on an enlarged scale showing an edge of a blade and the adjacent frame member as the blade approaches the closed position;

FIG. 7 is a fragmentary sectional view similar to FIG. 6 showing the blade in the fully closed position;

FIG. 8 is a fragmentary transverse sectional view through one side member of the damper assembly;

FIG. 9 is an exploded perspective view showing details of the frame and blade structure and side sealing arrangement;

FIGS. 10 and 10A are fragmentary transverse sectional view on an enlarged scale showing the wedge-shaped opposite ends of the same blade at the edge above the rotative axis relative to the side sealing member as the blade approaches the closed position (dash lines) and distorts the resilient sealing member;

FIG. 11 is a fragmentary transverse sectional view similar to FIG. 10 of one end of the blades and an alternative form of side sealing member;

FIG. 12 is a fragmentary sectional view on an enlarged scale showing an alternate embodiment wherein adjacent parallel-acting blades, each having sealing members according to the present invention, approach the closed position;

FIG. 13 is a fragmentary sectional view similar to FIG. 12 showing the blade edges in the fully closed position;

FIG. 14 is a fragmentary sectional view on an enlarged scale illustrating an alternative embodiment of a frame member and showing a blade approaching the closed position;

FIG. 15 is a fragmentary sectional view similar to FIG. 14 showing the blade in the fully closed position;

FIG. 16 is a perspective view of the alternate embodiment of a frame member of FIGS. 14 and 15 in engagement with the upper portion of a sidewall.

While a preferred form and several modifications of the improved damper assembly and blade construction have been shown and will be described, it is not intended that the detailed character of the discussion should limit the invention to such particulars. On the contrary, the invention is to cover all modifications and adaptations falling within the spirit and scope of the invention as more broadly or generally characterized in the appended claims.

For the purpose of illustration, the invention has been shown as embodied in a damper 20 assembly suitable for use in air distribution, ventilating, pneumatic conveying and comparable systems where it is required to control the air flow through a duct or similar passage. Referring to FIGS. 1 and 2 in general, the assembly 20 comprises a frame structure 21 adapted to be fitted in the duct (not shown) and defining a generally rectangular opening. The frame supports a plurality of damper blades 22 to pivot about spaced parallel axes between open and closed positions. While the blades 22 in the exemplary assembly 20 have been shown mounted to swing about horizontal pivots, it will be understood that they may be arranged with their pivots vertically disposed if desired.

In accordance with one aspect of the present invention, the construction of the blades 22 is such that they are structurally strong while affording the advantages of being relatively lightweight and thermally insulated to minimize heat loss or gain through the blades when in the closed position shown in FIG. 1. Referring to FIGS. 1-3, the blade 22 comprises wall members 24 and 25. In the embodiment shown, each of the wall members has its edges bent to render the members generally channel-shaped. As a result of this configuration, the wall members 24 and 25 resist longitudinal bending. The wall members 24 and 25 are shown affixed, as by suitable adhesive, to a central core member 27 which may be comprised of, for example, mineral board insulation. This type of laminated blade construction renders the blade a composite structure which is insulating, relatively inexpensive and lightweight while achieving a high degree of structural rigidity and resistance to bending and twisting. Further, in keping with the invention, a composite blade 22 as herein described may exhibit sound absorbing properties by employing a sound absorbing material as to the core member 27 and by perforating the wall member 24 or 25 facing the source of sound to be absorbed. The blade 22 in FIG. 9 is illustrated with such perforations 23. Highly satisfactory blades have been constructed using 26 gauge galvanized steel of the type commonly employed in air distribution and ventilating systems as the wall members 24 and 25 bonded to one-half inch thick mineral board insluation as the core member 27. Other materials, such as aluminum, could also be employed for the wall members. It is contemplated that many other materials could be used as the core member 27, the principal criteria being the insulating characteristics and the strength of the material. With respect to the latter, the core member 27 must cooperate with the wall members 24 and 25 to form a composite structure having the requisite strength for the particular application. Some suitable materials are wood, resin imprenated paper and corrugated paper, to name a few.

In accordance with an aspect of the present invention, at least one longitudinal edge of the blade is provided with a sealing member 28 to effect a seal between the adjacent blade edge or frame member when the blade is in the closed position. Referring again to FIG. 3, there is shown an edge sealing member 28 according to the present invention adapted to fit into and be retained in a longitudinal slot 29 along the edge 30 of a blade 22. In its cross section, the edge sealing member 28 has a tongue portion 31 which in FIG. 3, projects downward from the seal-effecting portion 32. The tongue portion 31 includes integrally formed ridges 34. These ridges 34 deflect upon insertion of the tongue portion 31 into the slot 29 in the blade edge 30 and, thereafter, resist removal of the tongue portion from the slot and also serve to create a seal to prevent leakage therebetween. An adhesive may also be employed to further secure and seal the tongue portion 31 in the blade edge slot 29.

Turning now to a consideration of the operation of the seal members 28 of the present invention, it is noted that U.S. Pat. No. 3,084,715 discloses a sealing arrangement particularly advantageous on opposite acting blades. AS illustrated in FIGS. 3 and 4 of that patent, resilient walls on adjacent edges of opposed acting blades contact one another as the blades near the closed portion and thereafter roll upon one another, compressing one another to assist in the formation of a good seal between adjacent blades when the blades are in the closed position.

FIGS. 1 and 2 of the present application disclose a sealing arrangement particularly advantageous in the case of parallel-acting blades which usually require a relatively high damper closing force to overcome the sliding friction occurring between the longitudinal edges. Sliding friction is experienced at both longitudinal edges of parallel acting blades and where such blades engage a smooth surface on the top or bottom frame member, e.g., the face portion 26 of the sealing strip 25 in FIGS. 1 and 2 of the referenced patent. While a blade-to-frame member sealing arrangement which reduces the sliding friction is shown in the referenced patent (FIG. 11, items 25, 51 and 52), that proposed system increases the resistance to air flow through the damper by introducing a projection into the flow stream. Further, that system requires two specially formed sealing members—i.e., the edge member and the frame member.

To achieve blade-to-blade and blade-to-frame sealing without the cooperating members sliding and generating friction forces to be overcome, and without increasing resistance to air flow through the damper, the present invention provides a rolling, flexing sealing strip which is applied to both parallel-acting blades and to blade-frame member seals. This sealing strip 28, illustrated in FIG. 3, eliminates sliding friction through operation in a manner analogous to a continuous belt. Still referring to the embodiment shown in FIG. 3, in its cross section the sealing strip 28 consists of two lobes 35 and 36. According to an aspect of the present invention, the material of the sealing strip 28 is chosen such that upon slight compression and application of a lateral tangential force in the direction of the arrow A the material in the seal will be transferred from one lobe into the other, with the sealing strip assuming a configuration of the nature illustrated by way of dotted lines in FIG. 3.

In order to effect the slight compression of the sealing strip 28 as the blades move into the closed position, the height H of the sealing strip in its unstressed condition is somewhat greater than the distance H' between the edge surface of the blade to which it is attached and the surface 38 of the adjacent blade 22 (shown dotted in FIG. 3) when the blades are in the closed position. This relationship causes the sealing strip 28 to be compressed as the blades 22 approach the closed position, permitting the material transfer to be effected and further serving to create a good sealing relationship between the sealing strip 28 and the surface 38 of the adjacent blade when in the fully closed position.

In keeping with an aspect of the present invention, once there is contact between the sealing strip 28 and the adjacent blade surface 38 as the blades are closing, there is little or no relative movement between the outer surface of the sealing strip and the adjacent blade surface. Instead, as the blades 22 continue to move relative to one another (Arrows B and C in FIG. 3) the material comprising the leading lobe 36 is transferred to the trailing lobe 35. FIG. 4 illustrates adjacent blades approaching the point of contact between a sealing strip and the edge 38 of an adjacent blade. FIG. 5 illustrates the blades in the fully closed position, with the unequal sized lobes resulting from the closing action. Upon opening the blades, the reverse of the above-described process will occur, namely, relative movement between the surfaces of the blades with no relative movement between the outer surface of the sealing strip 28 and the blade surface 38 will cause the excess material in the lobe 35 to be transferred back into the other lobe 36 until, at the point of separation of the sealing strip and blade surface, the lobes will be essentially in their unstressed, substantially equally sized state.

In addition to sealing along the longitudinal edges of adjacent blades, sealing is required between the edges of the blades adjacent frame members 39. A sealing strip 28 of the type described above may be employed to accomplish this sealing. Referring to FIGS. 6 and 7, there is shown a blade edge-to-frame member sealing arrangement according to the present invention. In a manner analogous to that discussed in connection with FIGS. 3-5, the blade edge is designed to be spaced a distance H' apart from the frame member 39 when the blade 22 is in the closed position, this distance being somewhat less than the unstressed height H of the sealing strip 28. Accordingly, as the blade 22 approaches the closed position, the outer surface of the sealing strip 28 will contact the frame member 39 and thereafter not move relative thereto. Instead, the material of the sealing strip will be transferred from the leading lobe 36 into the trailing lobe 35 as the blade moves into its closed position, as illustrated in FIG. 7.

According to another aspect of the present invention, in addition to a system for sealing along the longitudinal edges of parallel acting blades, a system is provided for sealing between the ends of the several blades 22 and the side frame members 40. Among the requirements of the sealing members in this area are that they effectively seal the duct without creating excess flow disturbances when the damper is open and without generating high frictional forces when operating the blades. Referring to FIG. 8, there is shown a sealing arrangement according to the present invention which only minimally affects the flow when the damper 20 is open and which offers a low level of resistance to opening and closing the blades 22. In the embodiment illustrated, a convex sealing strip 41 is disposed between the side frame member 40 and the end 42 of the blade 22. The sealing strip 41 may be formed from any suitable resilient material, e.g., neoprene. While the specific configuraton of the sealing strip 41 may vary from application to application, the arrangement illustrated in FIG. 8 is particularly advantageous. Referring to that Figure, and to the exploded view of the system in FIG. 9, the side frame member is formed with a recessed portion to accept the sealing strip. In the embodiment shown the recessed position comprises two V grooves 44 and 45 spaced on opposite sides of the center line of the side frame member 40 running between the top and bottom frame member 39. The central portion 46 of the side frame member between the two V grooves 44 and 45 is recessed from the plane defined by the surfaces 48 and 49. The edges of the sealing strip 41 are adapted to fit within the recess formed by the V grooves 44 and 45 and the interconnecting surface 46 with its exposed surface 47 being convex and projecting beyond the interior surfaces 48 and 49 of the side frame member 40. It will be appreciated that with this arrangement the V-grooves 44 and 45 not only permit the edges of the sealing strip 41 to be flush with the side frame member 40 (See FIG. 3), but also serve to enhance the strength of the side frame member.

Referring also to FIG. 11, an alternative form of side sealing strip member 41a is shown, made of thin resiliant sheet material, e.g., neoprene, and the side frame member 40a has grooves 44a and 45a in which the edge of the sealing strip 41a is preferably loosely received therein as shown; alternatively, the sealing strips may be clamped in the grooves.

While as illustrated in FIG. 9, the end of the blade 22 is flat, it is preferred that it be specially configured as shown in FIG. 10, with the portion of the end surface 50 (FIG. 9) above the center line being angled in one direction and the portion of the end surface 51 below the center line being angled in one direction and the portion of the end surface 51 below the center line being angled in the other direction. Most preferably, the angle of the end surface varies gradually from a maximum at the blade edge and merges at the blade axis where the direction of the angle changes. Referring to FIGS. 10 and 10A which illustrate the opposite ends of a single blade, it will be seen that the direction and degree of the angling of the end surfaces 50 and 51 is chosen to be generally tangential to the convex outer surface 47 of the sealing strip 41. With this arrangement, the angled end surfaces 50 and 51 of the blade 22 avoid sliding contact with the sealing strip 41 until the blade is very close to its closed position, at which time the angled surfaces wedge against the sealing strip. As the blade approaches its closed position, the effective length of the blade increases; i.e. the length of the blade measured from points of contact with the opposite side sealing members, causing the ends of the blade to distort the sealing members as shown in FIGS. 10 and 10A in dashed lines (and also in FIG. 11), creating a good seal, and resulting also in the blade being held in its closed position by the wedging action without the need for maintaining a positive turning force on the blade to hold it in closed position.

In keeping with an aspect of the present invention, to further minimize friction between the end surfaces 50 and 51 of the blade 22 and the side sealing member 41, two washers 52 are employed on the blade shaft 54 between the blade end 42 and the side seal 41 as shown in FIG. 9. These washers 52, preferably of a low friction material, e.g., teflon, reduce the rotational friction in the area near the blade shaft 54 where, despite the angled surfaces 50 and 51 of the blade 22, there is contact between the blade end and the sealing strip 41 throughout substantially the entire travel of the blade 22.

An alternative embodiment of a blade-to-blade sealing arrangement according to the present invention is illustrated in FIGS. 12 and 13. In this embodiment, an edge sealing strip 28 of the type discussed above is provided on the edges of each of the blades 22. In an arrangement analogous to the single sealing strip embodiment, the spacing "H" between the blade surfaces 28 and 38 is somewhat less than the combined unstressed height (equal to twice H in FIG. 3) of the sealing strip 28 such that the lobes 36 contact one another as the blades 22 approach the closed position. Thereafter, each of the sealing strips 28 are deformed, with the seal material being transferred out of the lending lobes 36 and into the trailing lobes 35. FIG. 13 illustrates the configuration of the sealing strips 28 with the blades 22 in the closed position.

Referring now to FIGS. 14 and 15, an alternative blade edge-to-frame sealing arrangement according to the present invention is illustrated. In this embodiment the frame member 39' is formed with stiffening ribs shown as V-grooves 55-57. These V-grooves 55-57 serve the primary purpose of lending strength to the frame member 39'. Pursuant to the invention, the V-groove 56 serves an additional function as a surface against which the sealing strip 28 can seat to further assure a good seal.

Referring to FIG. 16, yet another function of the V-grooves 55-57 is illustrated. By slotting the V-grooves at the respective points of intersection with the side frame member 40 the portions 58-60 of the side frame member 40 which align with the V-grooves 55-57 in top frame member engage the slots and may be deformed to serve as a means of fastening the frame member. A similar technique of fastening the side frame members to the top frame member would be employed where the side frame members have the configuration shown in FIG. 11.

I claim as my invention:

1. A damper assembly comprising, in combination, a generally rectangular frame member including side, top and bottom members, a plurality of damper blades supported at opposite ends in the side member of the frame for limited rotative movement about axes extending longitudinally and substantially along the center line of the blades, a resilient sealing strip supported in each side frame member, the outer surfaces of said sealing strips being convex and extending beyond the interior surfaces of said side frame members, portions of each end of said blades being individually angled to be generally tangential to said convex surface of said sealing strip as said blade approaches the closed position, each of said angled blade end portions wedging against said sealing strip to create a seal when said blades move into the closed position, and said assembly further comprising two washers at each blade end to reduce friction between the ends of said blades and said resilient strips at the rotative axes of said blades.

2. A damper blade comprising wall members and a core member to which said wall members are fastened to yield a composite structure, the core comprising a sound absorbing material and at least one of said wall members having perforations therein to improve the sound absorbing properties of the blade.

3. A damper assembly comprising, in combination a generally rectangular frame member including side, top and bottom members, a plurality of damper blades supported at opposite ends in the side members of the frame for limited rotative movement about axes extending longitudinally and substantially along the center line of the blades, a resilient sealing strip supported in each side frame member, the outer surfaces of said sealing strips being convex and extending substantially continuously the entire length of said frame members beyond the interior surface of said side frame members, each blade having portions of each end surface individually angled to be generally tangential to said convex surface of said sealing strip, with the portion of the end surface of each blade above the center line being angled in one direction and the portion of the end surface below the center line being angled in the other direction, the angled end surfaces of the blade having sliding contact with the convex sealing strip as the blade approaches its closed position, when the angled surfaces wedge in opposite directions against the sealing strip and due to the effective length of the blade increasing, distorting the strip both to create a seal for the entire end surface of the blade and to hold the blade in closed position due to the wedging action without the need for maintaining a positive turning force on the blade.

4. The damper assembly of claim 3 further including means bearing between the ends of each of said blades and said resilient strips at the rotative axis of said blades to reduce friction therebetween as said blades rotate.

5. The damper assembly of claim 3 wherein each damper blade comprises wall members and an insulating core member to which said wall members are fastened and form a composite structure.

6. A damper assembly comprising, in combination, a generally rectangular frame member including side, top and bottom members, a plurality of damper blades supported at opposite ends in the side member of the frame for limited rotative movement about axis extending longitudinally and substantially along the center line of the blades, a resilient impervious sealing strip supported in each side frame member extending substantially continuously lfrom the top to the bottom members, the outer surfaces of said sealing strip being convex and extending beyond the interior surfaces of said side frame members, portions of each end of said blades being individually angled to be generally tangential to said convex surface of said sealing strip as said blade approaches the closed position, the angled end portions of the blade having sliding contact with the convex sealing strip as the blade approaches its closed position, when the angled portions wedge against said sealing strip to create a seal when said blade moves into the closed position, distorting said sealing strip to hold the blade in closed position due to the wedging action of said angled end portion against said strip, without the need for maintaining a positive turning force on the blade, and said assembly further comprising means bearing between the ends of each of said blades and said resilient strips at the rotative axis of said blades to reduce friction therebetween as said blades rotate.

* * * * *